United States Patent
Perry et al.

(10) Patent No.: US 10,361,442 B2
(45) Date of Patent: Jul. 23, 2019

(54) SOFC SYSTEM AND METHOD WHICH MAINTAIN A REDUCING ANODE ENVIRONMENT

(71) Applicant: BLOOM ENERGY CORPORATION, Sunnyvale, CA (US)

(72) Inventors: Martin Perry, Mountain View, CA (US); Arne Ballantine, Palo Alto, CA (US); Michael Gasda, Mountain View, CA (US); Chockkalingam Karuppaiah, Cupertino, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 267 days.

(21) Appl. No.: 15/346,052

(22) Filed: Nov. 8, 2016

(65) Prior Publication Data
US 2018/0131018 A1    May 10, 2018

(51) Int. Cl.
| | |
|---|---|
| *H01M 8/04089* | (2016.01) |
| *H01M 8/0656* | (2016.01) |
| *H01M 8/04082* | (2016.01) |
| *H01M 8/04701* | (2016.01) |
| *H01M 8/04303* | (2016.01) |
| *H01M 8/04007* | (2016.01) |
| *H01M 8/04955* | (2016.01) |
| *H01M 8/04228* | (2016.01) |
| *H01M 8/124* | (2016.01) |

(52) U.S. Cl.
CPC ... *H01M 8/04097* (2013.01); *H01M 8/04074* (2013.01); *H01M 8/04201* (2013.01); *H01M 8/04228* (2016.02); *H01M 8/04303* (2016.02); *H01M 8/04708* (2013.01); *H01M 8/04955* (2013.01); *H01M 8/0656* (2013.01); *H01M 2008/1293* (2013.01)

(58) Field of Classification Search
None
See application file for complete search history.

(56) References Cited

U.S. PATENT DOCUMENTS

| | | | |
|---|---|---|---|
| 4,898,792 A | 2/1990 | Singh et al. | |
| 4,917,971 A | 4/1990 | Farooque | |
| 4,983,471 A | 1/1991 | Reichner et al. | |
| 5,034,287 A | 7/1991 | Kunz | |
| 5,047,299 A | 9/1991 | Shockling | |

(Continued)

FOREIGN PATENT DOCUMENTS

KR    100805445 B1 *    2/2008

OTHER PUBLICATIONS

English translation of KR100805445B1 to Ho (Year: 2008).*
Xu, B. et al., "Low-Temperature, Manganese Oxide-Based, Thermochemical Water Splitting Cycle." PNAS, vol. 109, No. 24, pp. 9261-9261, (2012).

(Continued)

*Primary Examiner* — Lucas J. O'Donnell
(74) *Attorney, Agent, or Firm* — The Marbury Law Group, PLLC (57) ABSTRACT

A solid oxide fuel cell system and method including a hotbox containing a fuel cell stack, a fuel supply configured to provide a fuel to the fuel cell stack, and a hydrogen supply thermally integrated with the hotbox. The hydrogen supply is configured to produce hydrogen during or shortly after the SOFC system is shutdown using residual heat of the hot box, and to provide the hydrogen to the SOFC stack such that an anode reducing environment is maintained in the stack.

10 Claims, 5 Drawing Sheets

(56) References Cited

U.S. PATENT DOCUMENTS

| | | | |
|---|---|---|---|
| 5,143,800 | A | 9/1992 | George et al. |
| 5,169,730 | A | 12/1992 | Reichner et al. |
| 5,170,124 | A | 12/1992 | Blair et al. |
| 5,302,470 | A | 4/1994 | Okada et al. |
| 5,441,821 | A | 8/1995 | Merritt et al. |
| 5,498,487 | A | 3/1996 | Ruka et al. |
| 5,527,631 | A | 6/1996 | Singh et al. |
| 5,573,867 | A | 11/1996 | Zafred et al. |
| 5,601,937 | A | 2/1997 | Isenberg |
| 5,733,675 | A | 3/1998 | Dederer et al. |
| 5,741,605 | A | 4/1998 | Gillett et al. |
| 6,013,385 | A | 1/2000 | DuBose |
| 6,051,125 | A | 4/2000 | Pham et al. |
| 6,051,329 | A | 4/2000 | Fasano et al. |
| 6,280,865 | B1 | 8/2001 | Eisman et al. |
| 6,329,090 | B1 | 12/2001 | McElroy et al. |
| 6,403,245 | B1 | 6/2002 | Hunt |
| 6,436,562 | B1 | 8/2002 | DuBose |
| 6,677,070 | B2 | 1/2004 | Kearl |
| 6,854,688 | B2 | 2/2005 | McElroy et al. |
| 7,514,166 | B2 | 4/2009 | Hickey et al. |
| 8,617,763 | B2 | 12/2013 | Armstrong et al. |
| 8,748,056 | B2 | 6/2014 | Batawi et al. |
| 2002/0058175 | A1 | 5/2002 | Ruhl |
| 2005/0053812 | A1 | 3/2005 | Hickey et al. |
| 2005/0106427 | A1 | 5/2005 | Murray et al. |
| 2005/0164051 | A1 | 7/2005 | Venkataraman et al. |
| 2007/0196702 | A1* | 8/2007 | Sridhar ............... B60L 11/1875 429/411 |
| 2008/0254336 | A1 | 10/2008 | Batawi |
| 2014/0295303 | A1* | 10/2014 | Matsuo ............. H01M 8/04664 429/423 |
| 2015/0044584 | A1* | 2/2015 | Ueyama ............. H01M 8/0612 429/418 |

OTHER PUBLICATIONS

Xu, B. et al., "Low-Temperature, Manganese Oxide-Based, Thermochemical Water Splitting Cycle." *Proceedings of the National Academy of Sciences of the United States of America* 109.24 (2012): http://www.ncbi.nlm.nih.gov/pmc/articles/PMC3386106/, *PMC*. Web. Jan. 29, 2015.

Austin, L.G., "Fuel Cells: Cell and Stack Construction: Low-Temperature Cells," A Review of Government Sponsored Research, NASA SP-120, 3 pages, (1967).

Milliken, C. E. et al., "Low Cost, High Efficiency Reversible Fuel Cell Systems," Proceedings of the 2002 U.S. DOE Hydrogen Program Review, NREUCP-610-32405, pp. 1-14, (2002).

Ruhl, R. C., "Low Cost Reversible Fuel Cell System," Proceedings of the 2000 U.S. DOE Hydrogen Program Review, Jun. 15, 2000, NREUCP-570-28890, pp. 1-9, (2000).

Lee, B. P., "Low Cost, Compact Solid Oxide Fuel Cell Generator," NASA Small Business Innovation Research Program, (2004).

Lee, B. P. et al., "Small, Ultra Efficient Fuel Cell Systems," Project Brief, Advanced Technology Program ATP 2001 Competition, 2 pages, (2002).

Technology Management Inc., "Low Cost, High Efficiency Reversible Fuel Cell (and Electrolyzer) Systems," Proceedings of the 2001 DOE Hydrogen Program Review NREUCP-570-30535, 8 pages, (2001).

Mitlitsky, F. et al., "Regenerative Fuel Cells for High Altitude Long Endurance Solar Powered Aircraft," 28m Intersociety Energy Conversion Engineering Conference (IECEC), Jul. 28, 1993, UCRL-JC-113485, 10 pages, (1993).

Mitlitsky, F. et al., "Unitized Regenerative Fuel Cells for Solar Rechargeable Aircraft and Zero Emission Vehicles," Fuel Cell Seminar, Sep. 6, 1994, UCRL-JC-117130, 9 pages, (1994).

Eguchi, K. et al., "Power Generation and Steam Electrolysis Characteristics of an Electrochemical Cell with a Zirconia- or Ceria-based Electrode," Solid State Ionics, vol. 86, No. 88, pp. 1245-1249, (1996).

\* cited by examiner

SOFC SYSTEM AND METHOD WHICH MAINTAIN A REDUCING ANODE ENVIRONMENT

BACKGROUND

The present invention is generally directed to a solid oxide fuel cell (SOFC) system configured to maintain a non-oxidizing anode environment.

Fuel cells are electrochemical devices which can convert energy stored in fuels to electrical energy with high efficiencies. A solid oxide fuel cell (SOFC) generates electrical energy and reactant product from fuel and oxidizer. The SOFC contains a ceramic electrolyte, a negative or fuel electrode and a positive or oxygen electrode. The electrolyte is usually a doped zirconia ceramic. The negative or fuel electrode (referred hereto as the "anode" electrode) may be made from a cermet, such as a nickel-yttria stabilized zirconia ("YSZ") or nickel-scandia stabilized zirconia (SSZ) cermet. The positive or oxygen electrode (referred hereto as the "cathode" electrode) is usually made of a ceramic perovskite material, such as lanthanum strontium manganite ("LSM") having a formula $(La,Sr)MnO_3$ or lanthanum strontium cobaltite ("LSCo") having a formula $(La,Sr)CoO_3$. Furthermore, contact layers, such as a Ni or nickel oxide anode contact layer and an LSM or LSCo cathode contact layer may be formed on the anode and cathode electrodes, respectively. The SOFC is usually part of a system that includes electrically connected fuel cells and other components, such as gas separator/interconnect plates, seals, and electrical contacts. Each gas separator/interconnect plate contacts the electrode and/or current collector layer of adjacent fuel cells.

SUMMARY

According to various embodiments, a solid oxide fuel cell (SOFC) system comprises a hotbox containing a SOFC stack, a fuel supply configured to provide a fuel to the fuel cell stack, and a hydrogen supply thermally integrated with the hotbox. The hydrogen supply is configured to produce hydrogen during or shortly after the SOFC system shutdown using residual heat of the hot box, and to provide the hydrogen to the SOFC stack such that an anode reducing environment is maintained in the SOFC stack.

According to various embodiments, a method of operating SOFC system comprises operating the SOFC system which includes a hotbox containing a SOFC stack, a fuel supply and a hydrogen supply in steady state to generate electricity using fuel provided from the fuel supply, performing a shut down the SOFC system, and providing hydrogen from the hydrogen supply during or shortly after the SOFC system shutdown using residual heat of the hot box to the SOFC stack such that an anode reducing environment is maintained in the SOFC stack.

According to various embodiments, a solid oxide fuel cell (SOFC) system comprises a hotbox containing a SOFC stack, a fuel supply configured to provide a fuel to the fuel cell stack, an electrolyzer fluidly connected to the fuel inlet conduit of the hotbox, a water source, and a power source electrically connected to the hydrogen supply. The electrolyzer is configured to use power provided by the power source during or shortly after system shutdown to electrolyze water from the water source to produce hydrogen and to provide the hydrogen to the SOFC stack such that an anode reducing environment is maintained in the SOFC stack.

DETAILED DESCRIPTION OF THE EXEMPLARY EMBODIMENTS

The accompanying drawings, which are incorporated herein and constitute part of this specification, illustrate example embodiments of the invention, and together with the general description given above and the detailed description given below, serve to explain the features of the invention.

The term "fuel cell stack," as used herein, means a plurality of stacked fuel cells which share a common fuel inlet and exhaust passages or risers. The "fuel cell stack," as used herein, includes a distinct electrical entity which contains two end plates which are connected to power conditioning equipment and the power (i.e., electricity) output of the stack. Thus, in some configurations, the electrical power output from such a distinct electrical entity may be separately controlled from other stacks. The term "fuel cell stack" as used herein, also includes a part of the distinct electrical entity. For example, the stacks may share the same end plates.

Figure 1:
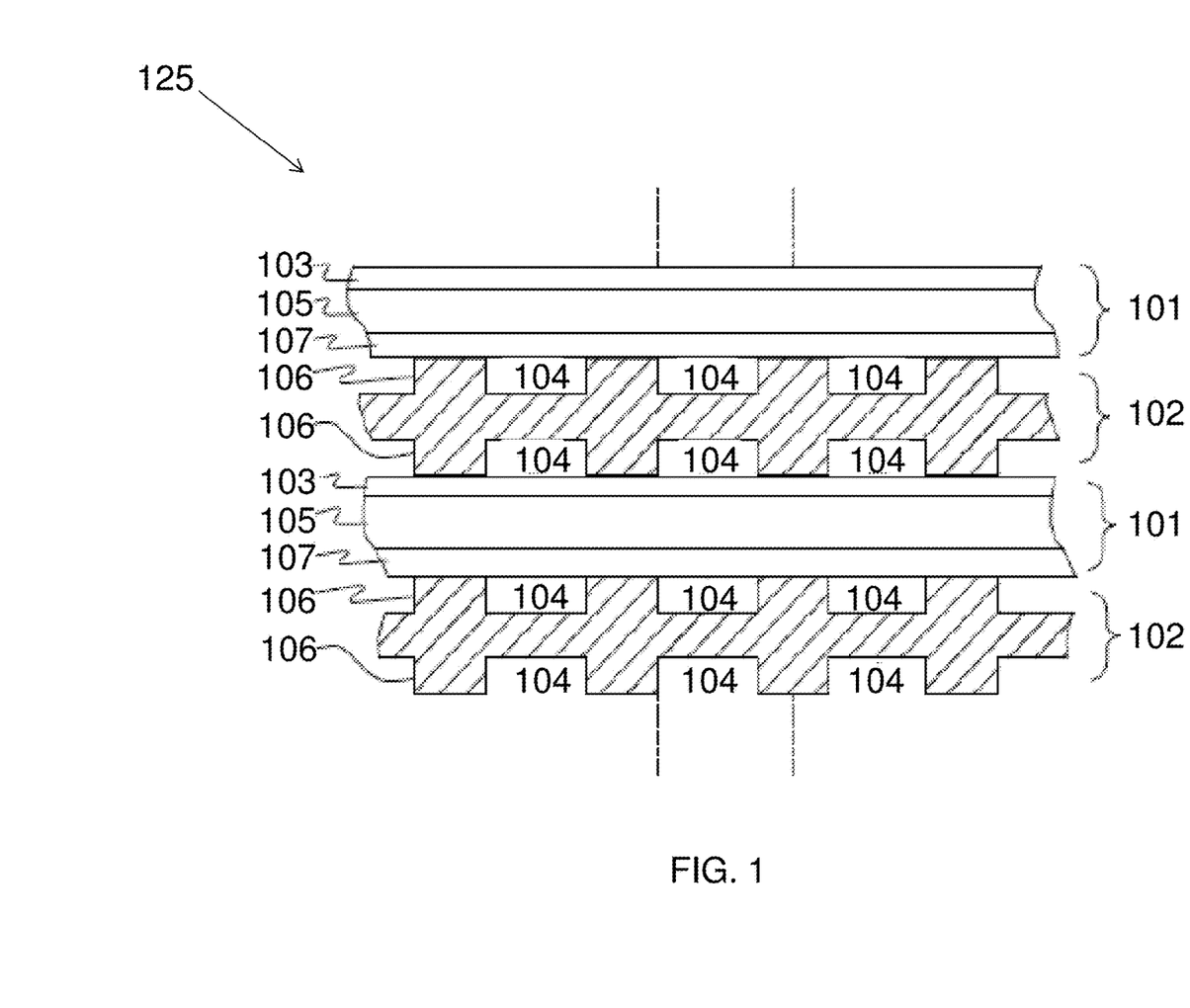
FIG. 1 is a schematic side cross-sectional view of an exemplary SOFC stack.

FIG. 1 is a side cross-sectional view of an exemplary SOFC stack 125. In the SOFC stack 125, each SOFC 101 comprises an anode electrode 103, a solid oxide electrolyte 105, and a cathode electrode 107 located on an opposite side of the electrolyte from the anode electrode. Fuel cell stacks are frequently built from a multiplicity of SOFC's 101 in the form of planar elements, tubes, or other geometries. Fuel and air has to be provided to the electrochemically active surface, which can be large.

The gas flow separator 102 (referred to as a gas flow separator plate when part of a planar stack), containing gas flow passages or channels 104 between ribs 106, separates the individual cells in the stack. The gas flow separator plate separates fuel, such as a hydrocarbon fuel, flowing to the fuel electrode (i.e. anode 103) of one cell in the stack from oxidant, such as air, flowing to the air electrode (i.e. cathode 107) of an adjacent cell in the stack. At either end of the stack, there may be an air end plate or fuel end plate (not shown) for providing air or fuel, respectively, to the end electrode.

Frequently, the gas flow separator plate 102 is also used as an interconnect which electrically connects the anode or fuel electrode 103 of one cell to the cathode or air electrode 107 of the adjacent cell. In this case, the gas flow separator plate which functions as the interconnect is made of or contains electrically conductive material. FIG. 1 shows that the lower SOFC 101 is located between two interconnects 102.

SOFC anode electrodes 103 are usually fabricated from a nickel based ceramic-metal (cermet) mixtures. The cermet mixtures include nickel-doped ceria (e.g., samaria doped ceria), nickel-stabilized zirconia (e.g., scandia or yttria stabilized zirconia), nickel-doped ceria and stabilized zirconia, etc. cermets, such as the cermets described in U.S. Pat. Nos. 8,748,056 and 8,617,763 and U.S. Published Application Number US 2008-0254336 A1, incorporated herein by reference in their entirety. For proper SOFC operation, the metallic component of these anodes 103 is kept reduced. When the metallic component oxidizes (i.e., is converted from a metal to a metal oxide), the electrical conductivity of the anode 103 drops by several orders of magnitude and the anode 103 must be re-reduced (i.e., converted back to a metal by an anneal in a reducing ambient or by electrochemical reduction) to properly operate.

Many anodes 103 are unable to withstand oxidation-reduction cycles at all because they delaminate from the electrolyte during the cycles due to the volume changes of its constituents. Although carefully engineered cermets may at least partially avoid a significant volume change during the oxidation and reduction cycles, and thereby provide a degree of oxidation-reduction cycling capability, they nonetheless may experience significant permanent performance degradation after the oxidation-reduction cycle.

An important operating challenge for SOFC systems are "emergency stops" in which the SOFC system is suddenly shut down (i.e., stops generating electricity) and is left to cool down without active control or intervention. An emergency stop may be caused by a number of factors, such as a failure of a system component (e.g., a failure of an air and/or fuel blower or pump, failure of fuel piping, failure of stack components, etc.), interruption in the supply of fuel or air to the system, failure or disconnection of an electrical load, activation of an emergency shutdown in case of an environmental emergency (e.g., earthquake, tornado, hurricane, etc.) or electrical overload, etc. The emergency stop may be intentionally activated by the system computer controller or by a human operator in response to a system condition (e.g., component failure, disruption of fuel or air supply, etc.) or the emergency stop may occur unintentionally due to an unforeseen event. During an emergency stop, anode oxidation occurs as air slowly enters the anode side of each fuel cell by diffusion along the fuel plumbing (e.g., from the fuel inlet or outlet conduits after fuel flow to the system is stopped during the emergency stop) while stack temperatures slowly decays due to conductive and natural convection heat loss.

In embodiments of the present disclosure, a SOFC system is configured to reduce anode degradation by controlling an anode operating environment. In particular, during a shutdown of an SOFC, such as a controlled shutdown or an emergency shutdown, fuel flow to the anode side of a fuel cell is stopped. Since the fuel contributes to the production of a reducing anode environment, the lack of fuel may result in an oxidizing anode environment.

Therefore, the embodiments of the present disclosure provide a SOFC system that maintains a reducing anode environment after system shutdown by automatically providing a reducing gas to the anode of a fuel cell, when or shortly after a main fuel supply is shutoff. As used herein, "shortly after a main fuel supply is shutoff" means before the fuel cell stack (e.g., SOFC anode electrode in the stack) reaches a temperature of 750° C. or less. In particular, the SOFC system may include a hydrogen supply configured to maintain the anode reducing environment during operations where an oxidizing anode environment may otherwise occur. For example, the hydrogen supply may be automatically activated after a transition from a steady-state operation to a shutdown operation, and in some embodiments automatically providing the hydrogen to the anode electrodes of the stack without using any electricity and/or without any human intervention after shutdown.

According to some embodiments, the hydrogen supply may be thermally integrated into a SOFC system, and may be plumbed to deliver hydrogen to an anode flow stream, when appropriately actuated. For example, the hydrogen supply may include a gas storage vessel, such as a gas tank or a gas storage pressure vessel housing a hydrogen source. The vessel may be heated by residual heat of the SOFC system hotbox after system shutdown to produce hydrogen ($H_2$) from the vessel during or shortly after shutdown to prevent anode oxidation. Herein, the production of hydrogen refers to the elution or release of physically or chemically stored hydrogen, as well as the thermochemical or electrochemical generation of hydrogen from other compounds.

In some embodiments, the hydrogen source may be a metal hydride or a material that, when exposed to SOFC operating temperatures, produces a thermochemical splitting cycle. The metal hydride may adsorb hydrogen at relatively a first temperature, and to evolve the adsorbed hydrogen at a higher second temperature. For example, the metal hydride may evolve hydrogen at temperatures ranging from about 300 to about 350° C. The metal hydride may include one or more of the following materials in Table 1, in which "A" has a high affinity for hydrogen and "B" has a low affinity for hydrogen.

TABLE 1

| Material Type | Exemplary Material |
|---|---|
| $AB_2$ | $ZrV_2$, $ZrMn_2$, $TiMn_2$, $TiV_{2-x}Mn_x$ |
| $AB_3$ | $CeNi_3$, $YFe_3$ |
| $A_2B_7$ | $Y_2Ni_7$, $Th_2Fe_7$ |
| $A_6B_{23}$ | $Y_6Fe_{23}$ |
| AB | TiFe, ZrNi |
| $A_2B$ | $Mg_2Ni$, $Ti_2Ni$ |
| $AB_5$ | $LaNi_5$, $LaNi_{5-x}Al_x$ |
| Alkali hydrides | $MgH_2$, $NaAlH_4$, $LiAlH_4$, LiH, $LiNH_2$, $LiBH_4$, $NaBH_4$ |

In other embodiments, a hydrogen and oxygen containing compound such as water (e.g., liquid water and/or steam) or potassium hydroxide is provided to the hydrogen source to thermochemically produce hydrogen from the compound. The hydrogen source may include a material that thermochemically generates hydrogen (e.g., a thermochemical hydrogen generation source). For example, the thermochemical hydrogen generation source may include a metal/metal oxide material configured for redox cycling, such as $Zn/ZnO_2$ or the like. At high temperatures, the metal material may be oxidized by water or KOH to produce hydrogen gas and to convert the metal material to a metal oxide material. The hydrogen is provided to the anode electrodes during or shortly after (i.e., before the stack reaches 750° C.) shutdown. The metal/metal oxide material may be thermally reduced in hydrogen, when the SOFC system is in steady-state operation. During the steady-state operation the temperature of the SOFC stacks is above 750° C., such as between 780 and 900° C.

According to some embodiments, the hydrogen source may include a metal oxide (ceramic) material. For example, the metal oxide material may be ceria ($CeO_2$), doped ceria (dopants may include transition metals or rare earth elements, such as Zr, Hf, Sc, Mg, Ni, Fe, Mn, Cu, and Pr), and lanthanum-strontium manganite (LSM). These materials produce hydrogen when exposed to water as they cool from high temperatures.

Without wishing to be bound by theory, the hydrogen generation is thought to be caused by the donation of oxygen from water to fill oxygen vacancies in the ceramic material. The number of oxygen vacancies in the ceramic material decreases at lower temperatures, so, in the presence of water, oxygen is consumed by the ceramic material and hydrogen is produced. In particular, in the presence of water, oxygen is taken up by the ceramic material and hydrogen is produced. At higher temperatures after the system is restarted, the ceramic material may be regenerated by reacting with steam to produce oxygen.

According to various embodiments, the hydrogen source may include at least two different compounds that produce hydrogen in a multistep cycle. Such reactions may advantageously occur at temperatures of less than about 1000° C., such as temperatures ranging from about 800 to 900° C. For example, such multistep materials may include a material that participates in the sulfur-iodine cycle or a may include manganese oxide ($Mn_3O_4$) and sodium carbonate ($Na_2CO_3$). In the later case, the manganese oxide may react with water in the presence of the sodium carbonate ($Na_2CO_3$). In particular, a closed cycle of $Na_2CO_3$ and $Mn_3O_4$ may be employed to produce hydrogen at about 850° C. In particular, such a system may undergo the reactions shown in the following Table 2 from B. Xu, et al., "Low-Temperature, Manganese Oxide-Based, Thermochemical Water Splitting Cycle." *Proceedings of the National Academy of Sciences of the United States of America* 109.24 (2012): 9260-9264. PMC. Web. 29 Jan. 2015. http://www.ncbi.nlm.nih.gov/pmc/articles/PMC3386106/.

TABLE 2

| Step | Reaction | Temp (° C.) |
|---|---|---|
| 1 | $3Na_2CO_3(s) + 2Mn_3O_4(s) \rightarrow 4NaMnO_2(s) + 2CO_2(g) + 2MnO(s) + Na_2CO_3$ | 850 |
| 2 | $2MnO(s) + Na_2CO_3(s) + H_2O(g) \rightarrow H_2(g) + CO_2(g) + 2NaMnO_2(s)$ | 850 |
| 3 | $6NaMnO_2(s) + ayH_2O(l) + (3 + b)CO_2(g) \rightarrow 3Na_2CO_3(aq) + aH_xMnO_2 \cdot yH_2O(s) + bMnCO_3(s) + cMn_3O_4(s)$ | 80 |
| 4 | $aH_xMnO_2 \cdot yH_2O(s) + bMnCO_3 + \rightarrow (2 - c)Mn_3O_4(s) + ayH_2O(g) + bCO_2(g) + 0.5O_2(g)$ | 850 |
| Net | $H_2O(g) \rightarrow H_2(g) + 0.5O_2(g)$ | | a, b and c satisfy following relations: $a + b + 3c = 6$ and $(4 - x)a + 2b + 8c = 18$ According, according to the above reactions, 1 mole of hydrogen+3 moles $CO_2$ are produced for every 1 mole of steam+3 moles $Na_2CO_3$+2 moles $Mn_3O_4$. This produces a $H_2:CO_2$ ratio of 1:3, which is sufficient to maintain an anode reducing environment when supplied to a fuel cell stack. Accordingly, hydrogen may be produced by the hydrogen source when heated at about 850° C.

Figure 2A:
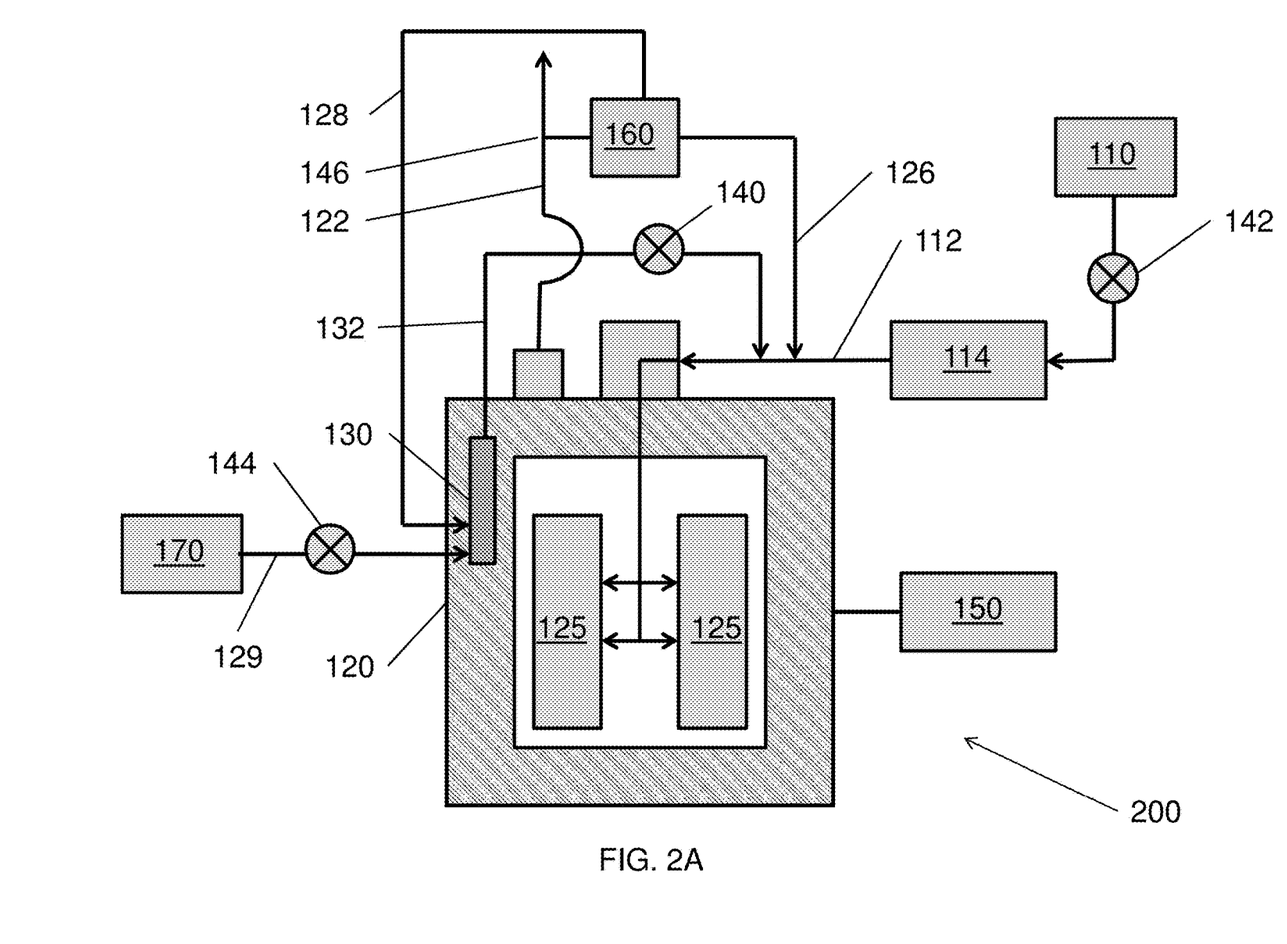
FIGS. 2A-2C are block diagrams of SOFC systems according to various embodiments of the present disclosure.

FIG. 2A is a block diagram of a SOFC system 200 according to various embodiments of the present disclosure. Referring to FIG. 2A, the system 200 may include a fuel supply 110 (e.g., a natural gas pipeline or fuel tank), a hotbox 120 including one or more SOFC stacks 125, at least one hydrogen supply 130 thermally integrated with a hotbox 120, a system controller 150, an optional hydrogen separator 160, a first valve 140, a second valve 142, an optional third valve 144 and an anode exhaust stream splitter 146. As used herein, the term thermally integrated means that the hydrogen supply 130 is configured to produce hydrogen during or shortly after the SOFC system is shutdown using residual heat of the hot box. Thus, the heat of the hot box 120 is provided to the hydrogen supply 130. The hydrogen supply 130 may be located between walls of the hot box 120, may be attached to an interior or exterior wall of the hot box 120 and/or may be connected to the wall(s) of the hot box using a thermally conductive material.

The system 200 may also include a catalytic partial oxidation (CPDX) reactor 114 disposed in fluid communication with the fuel conduit 112, between the fuel supply 110 and the hotbox 120. The CPDX reactor 114 may operate to reform the fuel provided from the fuel supply 110 into hydrogen gas or a hydrogen enriched fuel, such as syngas, during start-up of the system. However, the present disclosure is not limited to any particular type of fuel or fuel supply configuration. For example, the fuel supply 110 may be a hydrogen tank and may not include a CPDX reactor.

The first valve 140 may be configured to control hydrogen flow through a hydrogen conduit 132 fluidly connecting to the fuel conduit 112 to the hydrogen supply 130. The second valve 142 is configured to control the fuel inlet flow into the SOFC stacks through the fuel conduit 112. The splitter 146 may be configured to divert a portion of the stack anode exhaust from the exhaust conduit 122 to the separator 160. A hydrogen depleted anode exhaust stream is returned from the separator 160 to the fuel conduit 112 via a recycling conduit 126.

The separator 160 may be a hydrogen separator configured to separate hydrogen from the SOFC stack 125 anode exhaust stream. According to some embodiments, the separator 160 may include a hydrogen-permeable membrane, a pressure swing reactor, or the like. However, the present disclosure is not limited to any particular type of hydrogen separation device. The separator 160 may be disposed inside or outside the hotbox 120.

The separated hydrogen flow from the separator 160 to the hydrogen supply 130 through the recharge conduit 128. The hydrogen is stored in the hydrogen supply 130, such as in solid metal hydride form, for use during or shortly after system shutdown.

The hotbox 120 may include a thermally insulated housing configured to maintain the stacks 125 at an operating temperature. The temperature of different portions of the hotbox 120 may vary during steady-state operation, according to an air and/or fuel flow path (e.g., a fluid flow path) through the hotbox 120. For example, the temperature of an upper portion of hotbox 120 may be significantly lower than the temperature of a lower portion of the hotbox 120. However, during shutdown, the temperature of the hotbox 120 equilibrates (e.g., warmer portions cool and cooler portions warm).

As such, the location of the hydrogen supply 130 with respect to the hotbox 120 may be selected according to the type of hydrogen source included therein and/or the fluid flow path of the hotbox 120. For example, in the embodiment of FIG. 2A, the upper portion of the hotbox 120 may remain at a lower temperature than the lower portion during steady-state operation. As such, if the hydrogen supply 130 contains a hydrogen source that produces hydrogen at a given temperature (e.g., a metal hydride hydrogen source which desorbs hydrogen at a certain temperature or temperature range), the hydrogen supply 130 may be thermally integrated with an upper portion of a sidewall of the hotbox 120 or with the top of the hotbox 120. However, the present disclosure is not limited to any particular location for the hydrogen supply 130.

The controller 150 may be configured to control various elements of the system 200, such as the second valve 142 and/or the output voltage or current from the SOFC stacks 125 during steady-state and/or shutdown operations of the system 200. However, one or more of these elements may be operated manually. Further, one or more of these elements may operate automatically (e.g., without receiving power and/or control signals), during at least the shutdown of the system 200.

In particular, during steady-state operation, the first valve 140 may be closed such that hydrogen is not provided to the stacks 125 from the hydrogen supply 130, and the second valve 142 may be opened, such that fuel is provided to the stacks 125 from the fuel supply 110.

During shutdown, the second valve 142 may be closed automatically or by the controller 150 to cutoff the fuel supply 110 from the SOFC stacks 125 (i.e., to stop the flow of fuel to the stacks). The temperature of the upper portion of the hotbox 120 may be sufficiently high during or shortly after shutdown, such that the hydrogen supply 130 is heated to a temperature sufficient to produce (i.e., release or desorb) hydrogen. This heating process is described in detail below with regard to FIG. 3. The first valve 140 may be opened, such that the produced hydrogen may be provided from the hydrogen supply 130 to the SOFC stacks 125, via the hydrogen and fuel conduits 132, 112. As such, an anode reducing environment may be provided/maintained in the stacks 125 after shutdown before the stacks reach 750° C.

The first valve 140 may be a normally open valve which is powered by the SOFC stacks 125 (i.e., which receives voltage or current from the stacks). For example, the first valve 140 may include a biasing device, such as a spring or the like, that biases the first valve 140 towards an open position when the first valve 140 stops receiving power from the SOFC stacks 125. The first valve 140 may also include an actuator, such as a pneumatic pin configured to close the first valve 140 while the first valve receives power from the SOFC stacks 125.

According to some embodiments, the second valve 142 may be a normally closed valve which is powered by the SOFC stacks 125. For example, the second valve 142 may include a biasing device, such as a spring or the like, that biases the first valve 142 towards a closed position when it stops receiving power from the SOFC stacks 125. The second valve 142 may also include an actuator, such as a pneumatic pin configured to open the second valve 142 while it is receiving power from the SOFC stacks 125.

During shutdown when the SOFC stacks 125 stop producing power, the first valve 140 loses power and automatically opens, due to the biasing device thereof. The hydrogen supply 130 may produce hydrogen at a pressure sufficient for the hydrogen to flow into the SOFC stacks 125 in the hotbox 120, via the open first valve 140 and the hydrogen conduit 132. In addition, the second valve 142 may automatically close, due to the biasing device thereof, thereby cutting off fuel flow from the fuel supply 110 to the SOFC stacks 125.

As such, even when the system 200 is shutdown, hydrogen may automatically be provided to the anode electrodes of the SOFC stacks 125, and/or the fuel flow from the fuel supply 110 may be automatically stopped, without the need for the application of internal or external power to the first and/or second valves 140, 142, or the use of a control signals, such as control signals provided by the controller 150.

According to some embodiments, the hydrogen supply 130 may be recharged from an external hydrogen source, such as a hydrogen tank 170 or conduit 129. In the alternative, the hydrogen supply 130 may be replaced with a fresh hydrogen supply after it is exhausted. As such, the recharge conduit 128 and the hydrogen separator 160 may be omitted in some embodiments.

Thus, according to some embodiments, the system 200 may optionally include a hydrogen tank 170, a tank conduit 129, and a third valve 144. In this case, the recharge conduit 128 may be omitted. The third valve 144 is opened when the hydrogen storage 130 is recharged with hydrogen.

Figure 2B:
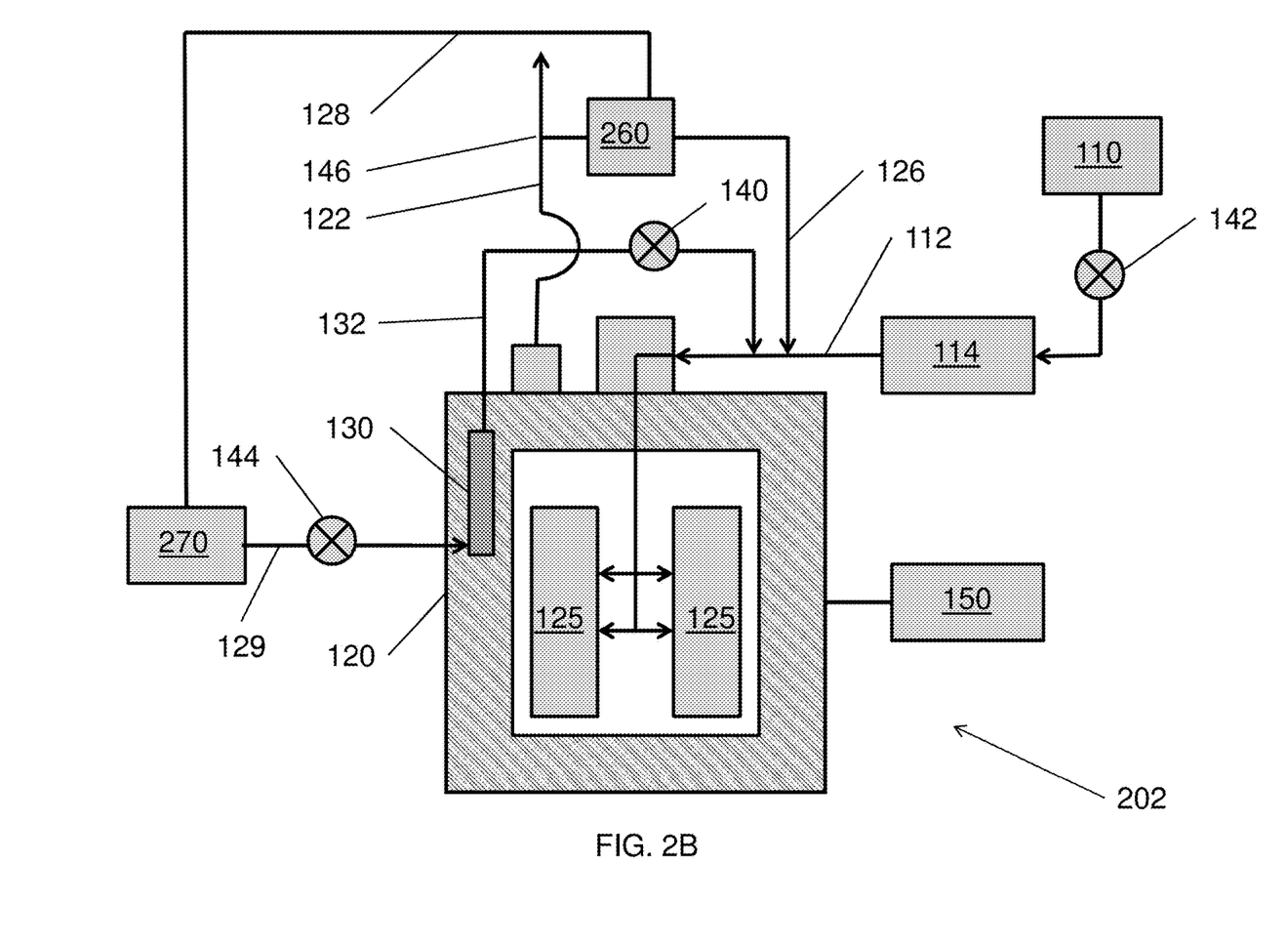

FIG. 2B is a block diagram of a SOFC system 202 according to various embodiments of the present disclosure. The system 202 is similar to the system 200. Accordingly, only the differences there between will be discussed in detail.

In the embodiment shown in FIG. 2B, the hydrogen supply 130 may include a thermochemical hydrogen generation source as described above, such as a metal or metal oxide. The system 202 may include a fluid source 270, such as a fluid storage tank or water pipe 270. For example, the fluid in the fluid source 270 may include water or potassium hydroxide. The third valve 144 may be a normally open valve configured to control flow through the tank conduit 129, which connects the fluid source (e.g., tank 170) to the hydrogen supply 130.

During steady-state operation, the first and third valves 140, 144 may be closed. During shutdown, the first and third valves 140, 144 may be opened. As such, the water (e.g., liquid water and/or steam) or potassium hydroxide may be provided to the hydrogen supply 130 and may react with the hydrogen source to produce hydrogen. The hydrogen may then be provided to the stacks 125 through the hydrogen conduit 132. As such, a reducing anode environment may be maintained in the stacks 125.

Referring to FIG. 2B, the system 202 may include an optional water separator 260, and the fluid source 270. The water separator 260 may be configured to separate water from the hotbox exhaust (i.e., from the SOFC stack 125 anode and/or cathode exhaust streams). For example, the water separator 260 may be a membrane separator or the like. The separator 260 may be connected to the water tank 270 by a recharge conduit 128. The water tank 270 may be connected to the hydrogen supply 130 by a tank conduit 129.

The third valve 144 may be a normally open valve configured to control water flow through the tank conduit 129. The hydrogen supply 130 may contain a metal or metal oxide thermochemical hydrogen generation source as described above, such as $Na_2CO_3$ and $Mn_3O_4$, ceria, LSM, $Zn/ZnO_2$ or the like described above.

During steady-state operation, the separated water may be stored in the tank 270 and the third valve 144 may be closed. During shutdown, the third valve 144 may open such that water is provided to the hydrogen supply 130 from the water tank 270. The water oxidizes the hydrogen source and produces hydrogen using the residual heat from the hot box 120.

The first valve 140 may be opened, and the produced hydrogen may be provided to the hotbox 120 through the hydrogen conduit 132. As such, a reducing anode environment may be provided in the stacks 125. According to some embodiments, the separator 260 and the recharge conduit 128 may be omitted. In this case, the tank 270 may be filled with water from an external source (e.g., water pipe).

Figure 2C:
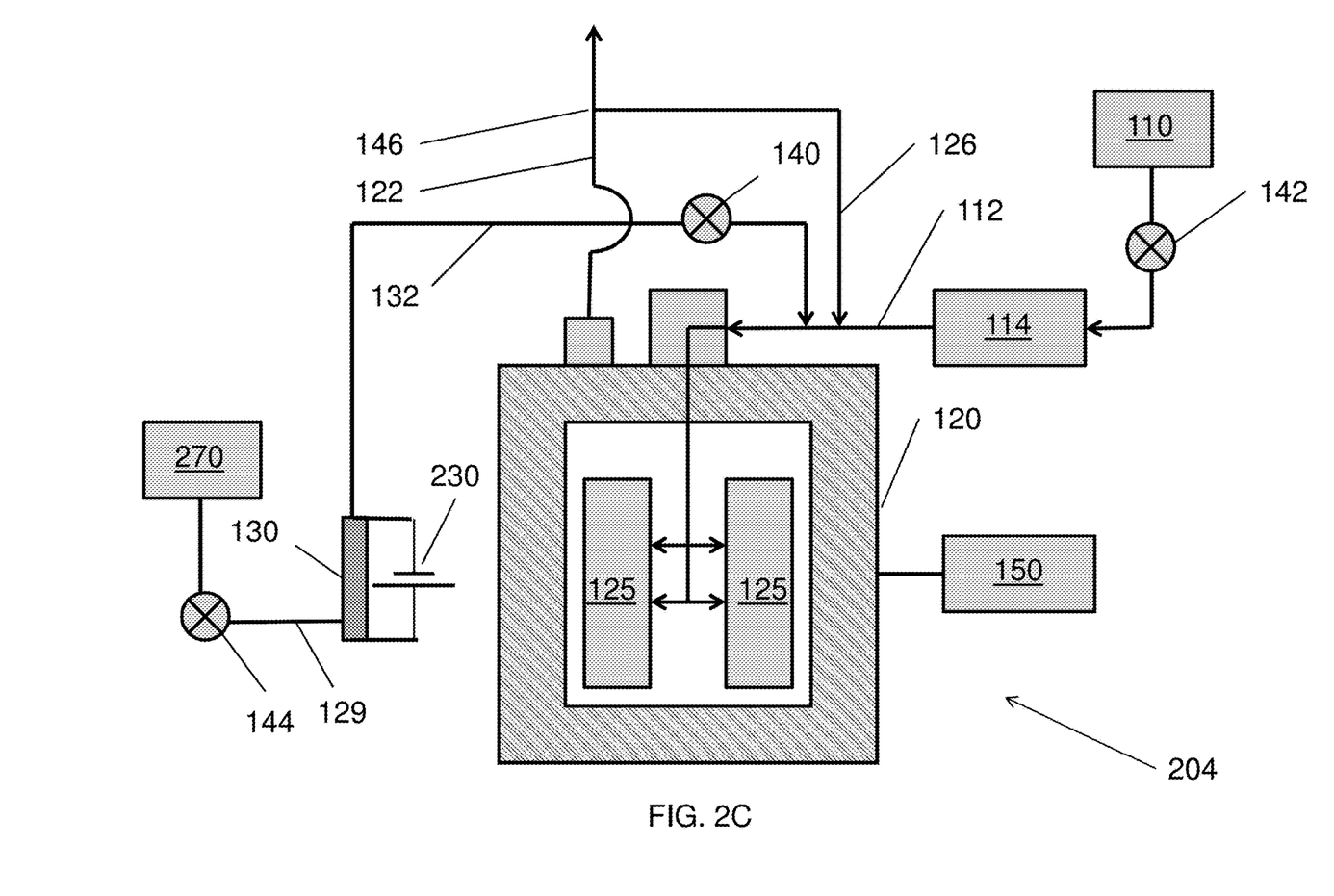

FIG. 2C is a block diagram of a SOFC system 204 according to various embodiments of the present disclosure. The system 204 is similar to the system 202. Accordingly, only the differences therebetween will be discussed in detail.

Referring to FIG. 2C, the hydrogen supply 130 may comprise an electrolyzer. The electrolyzer 130 is powered by a power source 230 other than the SOFC stacks 125. The power source 230 may comprise a battery, an ultracapacitor and/or a power grid connection. If the power source comprises a battery or ultracapacitor, then the power source 230 may be charged by the SOFC stacks 125 during steady state operation of the system. In this embodiment, the hydrogen supply 130 may be located external from the hot box 120 and is not necessarily thermally integrated into the hot box 120. The electrolyzer 130 and power source are turned off during system steady state operation. During shutdown or shortly after shutdown, the controller 150 turns on the power source 230 and the electrolyzer 130 separates water from the water source 270 into hydrogen and oxygen. The oxygen is expelled from the electrolyzer 130 while the separated hydrogen is provided to the SOFC stacks 125 through the conduits 132 and 112.

Although various components and conduits in FIGS. 2A-2C are shown as being disposed outside of the hotbox 120, the present disclosure is not limited thereto. In particular, various components and conduits may be disposed inside of the hotbox 120. For example, the CPDX reactor 114, the separators 160, 260, the valves 140, 142 and 144, splitter 146, and/or the corresponding conduits may be disposed on or in the hotbox 120.

Figure 3:
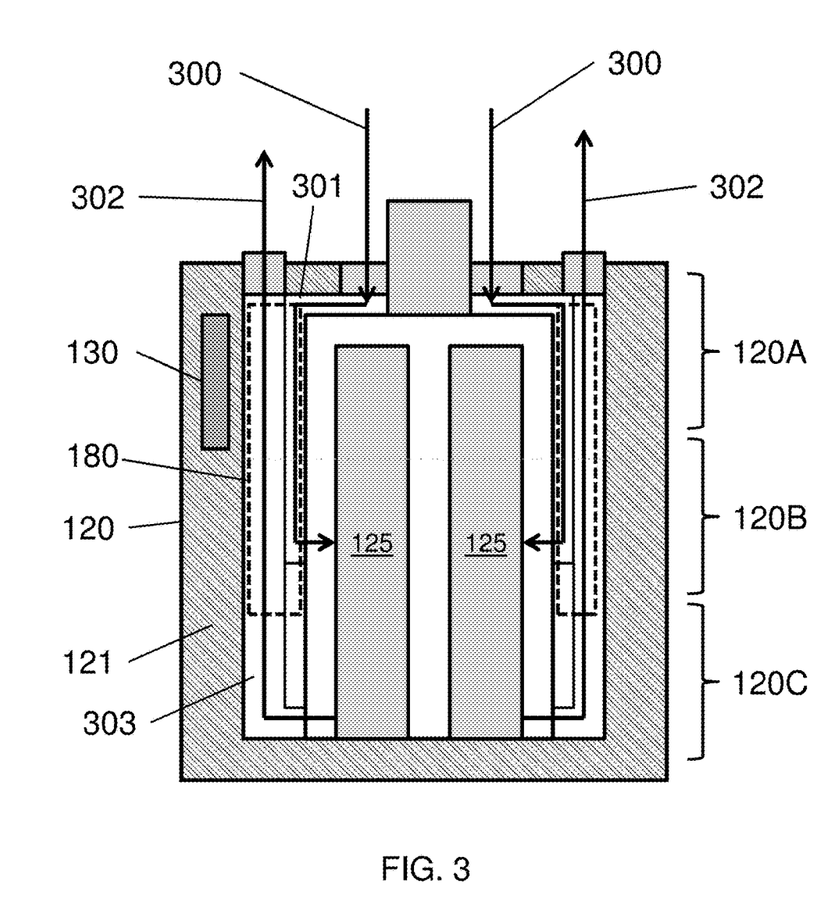
FIG. 3 is a block diagram showing air and exhaust flow in a hotbox of a SOFC system, according to various embodiments of the present disclosure.

FIG. 3 is a block diagram showing air inlet and exhaust flow streams in a hotbox 120, according to various embodiments of the present disclosure. Referring to FIG. 3, a cooler air inlet stream 300 may flow into the top of the hotbox 120 through an air inlet conduit 301, and then through an air heat exchanger 180 along an inner wall of the hotbox 120, before being supplied to the stacks 125. A hotter exhaust stream 302 from the stacks 125 may be collected from the bottom of the hotbox 120, before flowing through an exhaust conduit 303 in an opposing direction through the air heat exchanger 180 out the top of the hotbox 120. The exhaust stream 302 may be a stack air exhaust stream, a stack fuel exhaust stream or an anode tail gas oxidizer exhaust stream which is formed by oxidizing the stack fuel exhaust stream in an anode tail gas oxidizer using the stack air exhaust stream. The counter current flow of the air inlet stream 300 and the exhaust stream 302 in the air heat exchanger 180 results in heat transfer from the relatively hot exhaust stream 302 to the relatively cool air 300. Additional details of the flow streams and the air heat exchanger 180 are described in U.S. Pat. No. 8,968,943, issued on Mar. 3, 2015, which is incorporated herein by reference in its entirety.

During steady-state operation, the above flow configuration may result in a temperature gradient in the hotbox 120, such that the top of the hotbox 120 has a lower temperature than the bottom of the hotbox 120. In other words, the incoming air inlet stream 300 may cool an upper portion 120A of the hotbox 120. For example, the upper portion 120A of the hotbox 120 may be relatively cool, a lower portion 120C of the hotbox 120 may be relatively hot, and a middle portion 120C of the hotbox 120 may have a temperature between that of the upper and lower portions 120A, 120C.

For example, the upper portion may have a temperature ranging from about 150 to about 300° C., such as from about 175 to about 225° C., or about 200° C. The lower portion 120C may have a temperature ranging from about 700 to about 900° C., such as from about 775 to about 825° C., or about 800° C. The middle portion 120B may have a temperature ranging from about 450 to about 550° C., such as from about 475 to about 525° C., or about 500° C. Herein, the hotbox temperatures refer to temperatures taken inside of an inner surface of an insulation layer 121 of the hotbox 120.

During and/or shortly after the system shutdown, the flow of the air inlet stream 300, the exhaust stream 302, and the fuel inlet stream through conduit 112 to the hotbox 120 are stopped, and the temperature variations between the portions 120A, 120B, 120C of the hotbox 120 are reduced. In particular, without the cooling effect of the air inlet stream 300, the hotbox 120 may be more evenly heated by residual heat from the fuel cell stacks 125 and/or from the insulation 121 located in the bottom portion of the hot box 120C. For example, the insulation 121 in all of the portions 120A, 120B, 120C of the hot box 120 may reach a equilibrium temperature ranging from about 400 to about 700° C., such as from about 500 to about 650° C., or about 600° C. In other words, the temperature of the upper portion 120A may increase while the temperature of the hotbox 120 equalizes. Thereafter, the temperature of the hotbox 120 may decline over time as the hotbox 120 cools.

When the hydrogen supply 130 is located in the upper portion 120A, the increase in temperature of the upper portion 120A after shutdown may heat the hydrogen supply 130 to or above a temperature sufficient to produce (i.e., release or desorb) hydrogen. In contrast, during steady-state operation, the hydrogen supply 130 may remain at a lower temperature at which hydrogen is not produced (i.e., not released or desorbed), due to the cooling effect of the air inlet stream.

In view of the temperature characteristics of the hotbox 120, the location of the hydrogen supply 130 may be selected according to the hydrogen storage and release temperatures of the hydrogen supply 130. For example, the location of the hydrogen supply 130 may be moved closer to the top of the hotbox 120, if the hydrogen supply 130 should be kept at a relatively lower temperature during steady-state operation, and may be moved closer to the bottom of the hotbox 120, if higher steady-state operating temperatures are desired.

In some embodiments, the radial location of the hydrogen supply 130 within the insulation layer 121 of the hotbox 120 may be selected according to the hydrogen storage and release temperatures of the hydrogen supply 130. For example, temperatures inside of the insulation layer 121 may decrease from an inner surface to an outer surface of the insulation layer 121. Therefore, the location of the hydrogen supply may be adjusted vertically and/or horizontally (i.e., radially for a cylindrically shaped hot box) to achieve a desired temperature for the hydrogen supply 130.

As described above, the hydrogen supply 130 is cooled by an air inlet stream 300 supplied to the SOFC stack 125 during the steady-state operation. During the steady-state operation, the hydrogen supply 130 has a temperature above hydrogen filling temperature and below hydrogen release or desorption temperature of the hydrogen supply due to its cooling by the air inlet stream.

However, during or shortly after shutdown of the SOFC system, the air inlet stream 300 is turned off and the hydrogen supply is no longer cooled by the air inlet steam 300. Thus, during or shortly after the SOFC system shutdown, the hydrogen supply temperature is increased to or above hydrogen release or desorption temperature after the air inlet stream is turned off and hydrogen is released from the hydrogen supply 130 to the stacks 125.

The foregoing description of the invention has been presented for purposes of illustration and description. It is not intended to be exhaustive or to limit the invention to the precise form disclosed, and modifications and variations are possible in light of the above teachings or may be acquired from practice of the invention. The description was chosen in order to explain the principles of the invention and its practical application. It is intended that the scope of the invention be defined by the claims appended hereto, and their equivalents.

What is claimed is:

1. A method of operating a solid oxide fuel cell (SOFC) system, comprising:
 operating the SOFC system which includes a hotbox containing a SOFC stack and a hydrogen supply, in steady-state by:
  providing a flow of fuel from a fuel supply to the SOFC system to generate electricity and maintain the SOFC stack at a temperature of above 750° C.; and
  maintaining the hydrogen supply at a temperature ranging from about 150° C. to about 300° C. to store hydrogen; and
 shutting down the SOFC system by:
  stopping the flow of the fuel to the SOFC system;
  heating the hydrogen supply to a temperature ranging from about 400° C. to about 650° C. using residual heat of the hotbox to release the stored hydrogen; and
  providing the hydrogen released from the hydrogen supply to the SOFC stack before the SOFC stack temperature drops below 750° C., such that an anode reducing environment is maintained in the SOFC stack.

2. The method of claim 1, wherein:
 the operating the SOFC system in the steady-state further comprises supplying electricity to a normally open valve, such that the normally open valve remains closed and the hydrogen is not provided from the hydrogen supply to the SOFC stack; and
 the shutting down the SOFC system further comprises supplying no electricity to the normally open valve, such that the normally open valve automatically opens to provide the hydrogen from the hydrogen supply to the SOFC stack.

3. The method of claim 1, wherein the hydrogen supply is embedded between walls of the hotbox or disposed inside of the hotbox.

4. The method of claim 3, wherein the hydrogen supply is disposed in a portion of the hotbox that is maintained at the temperature ranging from about 150° C. to about 300° C. during the operating the SOFC system in the steady-state.

5. The method of claim 1, wherein the hydrogen supply comprises a solid metal hydride hydrogen storage material.

6. The method of claim 5, further comprising:
 separating hydrogen from an anode exhaust of the SOFC stack; and
 providing the separated hydrogen to the hydrogen supply.

7. The method of claim 1, wherein the hydrogen supply comprises a thermochemical hydrogen generation source which produces the hydrogen from a hydrogen and oxygen containing source using the residual heat of the hotbox.

8. The method of claim 7, wherein:
 the thermochemical hydrogen generation source comprises a material selected from zinc, ceria ($CeO_2$), ceria doped with a transition metal or a rare earth, lanthanum-strontium manganite (LSM) and a combination of sodium carbonate and $Mn_3O_4$; and
 the hydrogen and oxygen containing source comprises water or potassium hydride which is provided to the thermochemical hydrogen generation source during or shortly after the shutdown of the SOFC system.

9. The method of claim 8, further comprising:
separating water from an exhaust output from the hotbox;
storing the separated water; and
providing the stored water to the hydrogen supply during the shutdown of the SOFC system.

10. The method of claim 1, wherein:
during the operating the SOFC system in the steady-state, the hydrogen supply is cooled by an air inlet stream supplied to the SOFC stack; and
during the shutting down the SOFC system, the air inlet stream is turned off.

* * * * *